(12) United States Patent
Xu et al.

(10) Patent No.: US 11,996,781 B2
(45) Date of Patent: May 28, 2024

(54) ENERGY CONVERSION DEVICE, POWER SYSTEM AND VEHICLE (71) Applicant: BYD COMPANY LIMITED, Guangdong (CN)

(72) Inventors: Luhui Xu, Shenzhen (CN); Zhiyong Du, Shenzhen (CN); Jiawei Wan, Shenzhen (CN); Caiwen Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 349 days.

(21) Appl. No.: 17/622,188

(22) PCT Filed: Jun. 18, 2020

(86) PCT No.: PCT/CN2020/096819
§ 371 (c)(1),
(2) Date: Dec. 22, 2021

(87) PCT Pub. No.: WO2021/000739
PCT Pub. Date: Jan. 7, 2021

(65) Prior Publication Data
US 2022/0360183 A1 Nov. 10, 2022

(30) Foreign Application Priority Data
Jun. 30, 2019 (CN) .......................... 201910582147.9

(51) Int. Cl.
H02J 7/02 (2016.01)
B60L 53/22 (2019.01)
(Continued)

(52) U.S. Cl.
CPC ......... *H02M 3/33584* (2013.01); *B60L 53/22* (2019.02); *B60L 53/24* (2019.02);
(Continued)

(58) Field of Classification Search
CPC ........ H02J 7/02; H02J 7/04; H02J 7/06; H02J 7/14; H02J 7/1415; H02J 7/143;
(Continued)

(56) References Cited

U.S. PATENT DOCUMENTS 5,182,508 A 1/1993 Schauder
9,973,110 B2 5/2018 Sadki et al.
(Continued)

FOREIGN PATENT DOCUMENTS

CN 103684202 A 3/2014
CN 104092273 A 10/2014
(Continued)

OTHER PUBLICATIONS

International Search Report and Written Opinion for Application No. PCT/CN2020/096819, dated Sep. 22, 2020, 12 pages.

*Primary Examiner* — Thienvu V Tran
*Assistant Examiner* — Shahzeb K Ahmad (57) ABSTRACT An energy conversion apparatus, a power system, and a vehicle are provided. The energy conversion apparatus includes a motor coil (11) and a bridge arm converter (12). The bridge arm converter (12) is connected to an external battery (200) and an external charging port (10). The motor coil (11) is connected to the external charging port (10), and the motor coil (11) includes a plurality of phase windings, each phase winding includes N coil units, first ends of the N coil units of each phase winding are connected together and then connected to a corresponding phase bridge arm of the plurality of phase bridge arms, and second ends of coil units in each phase winding are connected to second ends of corresponding coil units in other phase windings and then selectively connected to the charging port (10).

20 Claims, 4 Drawing Sheets (51) Int. Cl.
  *B60L 53/24* (2019.01)
  *H02M 3/335* (2006.01)

(52) U.S. Cl.
  CPC ........... *H02J 7/02* (2013.01); *H02M 3/33571* (2021.05); *H02J 2310/48* (2020.01); *Y02T 10/70* (2013.01)

(58) Field of Classification Search
  CPC .. H02J 2310/40; H02J 2310/48; H02M 3/335; H02M 3/33571; H02M 3/33584; H02M 5/40; H02M 5/45; H02M 5/4505; H02M 5/458; H02M 7/42; H02M 7/515; H02M 7/521; H02M 7/66; H02M 7/757; B60L 53/20; B60L 53/22; B60L 53/24; Y02T 10/70
  See application file for complete search history.

(56) References Cited

U.S. PATENT DOCUMENTS

| | | | | |
|---|---|---|---|---|
| 10,124,753 | B2 * | 11/2018 | Bouchez | B60R 16/03 |
| 2007/0289794 | A1 * | 12/2007 | Ishikawa | B60L 53/24 |
| | | | | 180/165 |
| 2008/0094013 | A1 * | 4/2008 | Su | H02P 5/747 |
| | | | | 180/54.1 |
| 2014/0097792 | A1 * | 4/2014 | Su | B60L 53/12 |
| | | | | 320/108 |
| 2014/0265971 | A1 * | 9/2014 | Taube | H02J 7/1484 |
| | | | | 318/400.41 |
| 2018/0034399 | A1 * | 2/2018 | Bando | H02P 9/04 |

FOREIGN PATENT DOCUMENTS

| | | | |
|---|---|---|---|
| CN | 105743175 | A | 7/2016 |
| CN | 108365767 | A | 8/2018 |
| CN | 109672240 | A | 4/2019 |
| CN | 109713738 | A | 5/2019 |
| CN | 111434513 | A | 7/2020 |
| JP | 2014161142 | A * | 9/2014 |
| JP | 2014161142 | A | 9/2014 |
| KR | 20190070784 | A * | 6/2019 |

* cited by examiner

ENERGY CONVERSION DEVICE, POWER SYSTEM AND VEHICLE

CROSS-REFERENCE TO RELATED APPLICATIONS

This application is a National Phase Application of International Patent Application No. PCT/CN2020/096819, filed on Jun. 18, 2020, which is based on and claims priority to and benefits of Chinese Patent Application 201910582147.9, entitled "ENERGY CONVERSION APPARATUS, POWER SYSTEM AND VEHICLE" and filed on Jun. 30, 2019. The entire content of all of the above identified applications is incorporated herein by reference.

FIELD

This application relates to the field of vehicle technologies, and in particular, to an energy conversion apparatus, a power system, and a vehicle.

BACKGROUND

In recent years, with the development and rapid popularization of electric vehicles, charging of batteries of the electric vehicles has become increasingly important. At present, parallel-phase synchronous control is used for charging a battery of an existing electric vehicle. If an inductance of three-phase-windings of a motor cannot be fully utilized, a direct-current side ripple is increased and charging efficiency is reduced.

In view of the above, an existing battery charging method has the problems of a large direct-current side ripple and a low charging efficiency during charging.

SUMMARY

This application is intended to resolve one of the technical problems in the related art at least to some extent.

In view of this, embodiments of this application provide an energy conversion apparatus, a power system, and a vehicle, to resolve the problems of a large direct-current side ripple and a low charging efficiency during charging in an existing battery charging method.

A first aspect of the embodiments of this application provides an energy conversion apparatus, including a motor coil and a bridge arm converter connected to the motor coil, where the bridge arm converter is respectively connected to an external battery and an external charging port, the motor coil is connected to the external charging port, and the bridge arm converter includes a plurality of phase bridge arms.

The motor coil includes a plurality of phase windings. Each phase winding includes N coil units. First ends of the N coil units of each phase winding are connected together and connected to a corresponding phase bridge arm of the plurality of phase bridge arms. Second ends of the N coil units in each phase winding are respectively connected to second ends of corresponding coil units in other phase windings to form N neutral points. N neutral lines lead from the N neutral points, and M neutral lines in the N neutral lines are coupled to the external charging port, N being an integer greater than 1, and M being an integer greater than 1.

A second aspect of the embodiments of this application provides a power system, including the energy conversion apparatus provided in the first aspect. The energy conversion apparatus includes:

a motor, including the motor coil, where the motor coil is connected to the external charging port;
a motor control module, including the bridge arm converter, where the bridge arm converter is connected to the motor coil; and
an in-vehicle charging module, including the bidirectional bridge arm, where the bidirectional bridge arm is connected in parallel with the bridge arm converter, to form a first common connecting end and a second common connecting end, the first common connecting end is connected to a first end of the external battery, the second common connecting end is connected to a second end of the external battery, and the external charging port is connected to the second common connecting end and the bidirectional bridge arm.

A third aspect of the embodiments of this application provides a vehicle, including the power system provided in the second aspect.

Compared with the related art, the embodiments of this application have the following advantages. In this application, a motor coil and a bridge arm converter are adopted in an energy conversion apparatus. The bridge arm converter is connected to an external battery and an external charging port, and the motor coil is connected to the external charging port. Each of a plurality of phase windings of the motor coil includes a plurality of coil units. First ends of the plurality of coil units in each phase winding are connected together and then connected to a plurality of phase bridge arms of the bridge arm converter in a one-to-one correspondence, and second ends of the plurality of coil units in each phase winding are respectively connected to second ends of a plurality of coil units in other phase windings in a one-to-one correspondence and then selectively connected to the external charging port. In this way, when the energy conversion apparatus is charged, the plurality of coil units of the plurality of phase windings of the motor coil can be fully and effectively utilized, which not only meets requirements of a charging power but also reduces a direct-current side ripple, thereby resolving problems of a large direct-current side ripple and low charging efficiency during charging in an existing battery charging method.

Additional aspects and advantages of this application will be given in the following description, some of which will become apparent from the following description or may be learned from practices of this application.

DETAILED DESCRIPTION

Embodiments of this application are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and are to explain this application, and do not construe limitations to this application.

To describe technical solutions in this application, the following will be described by using specific embodiments.

Figure 1:
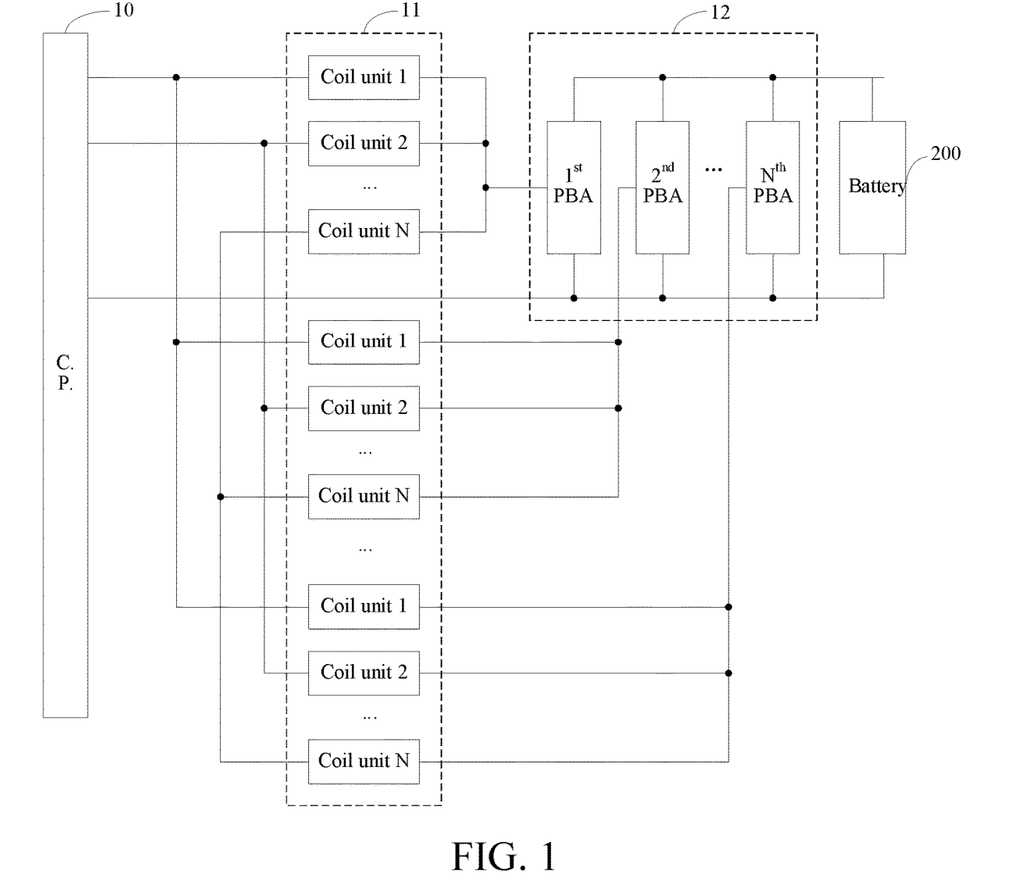
FIG. 1 is a schematic diagram of a module structure of an energy conversion apparatus according to a first embodiment of this application.

FIG. 1 is a schematic diagram of a module structure of an energy conversion apparatus according to a first embodiment of this application. As shown in FIG. 1, the energy conversion apparatus includes a motor coil 11 and a bridge arm converter 12 connected to the motor coil 11. The bridge arm converter 12 is connected to an external battery 200 and an external charging port 10, the motor coil 11 is connected to the external charging port 10, and the bridge arm converter 12 includes a plurality of phase bridge arms.

Specifically, a plurality of phase windings of the motor coil 11 each include N coil units, and first ends of the N coil units in each phase winding are connected together and then respectively connected to the plurality of phase bridge arms of the bridge arm converter 12 in a one-to-one correspondence. Second ends of the N coil units in each phase winding are connected to second ends of the N coil units in other phase windings in a one-to-one correspondence to form N neutral points. N neutral lines lead from the N neutral points, and M neutral lines in the N neutral lines are coupled to the external charging port, N being an integer greater than 1, and M being an integer greater than 1.

It should be noted that, in this application, the "external battery" and the "external charging port" described in this embodiment are "outside" relative to the energy conversion apparatus, but not "outside" of a vehicle where the energy conversion apparatus is located.

In this embodiment, in this application, the motor coil and the bridge arm converter are adopted in the energy conversion apparatus. The bridge arm converter is connected to the external battery and the external charging port, and the motor coil is connected to the external charging port; and the plurality of phase windings of the motor coil each include a plurality of coil units, first ends of the plurality of coil units in each phase winding are connected together and then connected to the plurality of phase bridge arms of the bridge arm converter in a one-to-one correspondence, and second ends of the plurality of coil units in each phase winding are connected to second ends of a plurality of coil units in other phase windings in a one-to-one correspondence and then selectively connected to the external charging port. In this way, when the energy conversion apparatus is charged, the plurality of coil units of the plurality of phase windings of the motor coil can be fully and effectively utilized, thereby meeting requirements of a charging power and reducing a direct-current side ripple.

Figure 2:
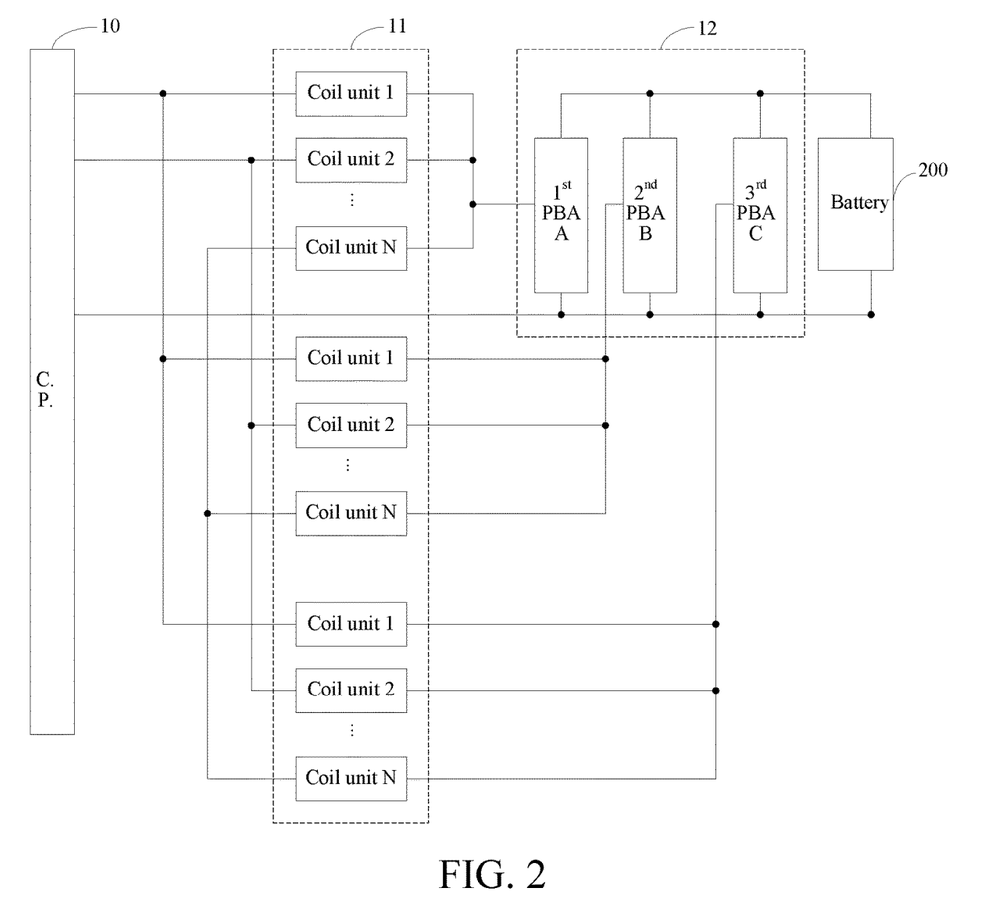
FIG. 2 is a schematic diagram of a module structure of an energy conversion apparatus according to a second embodiment of this application.

In other embodiments of this application, as shown in FIG. 2, a bridge arm converter 12 includes a first phase bridge arm A, a second phase bridge arm B, and a third phase bridge arm C. A plurality of phase windings of a motor coil 11 include three-phase windings, and each of the three-phase windings of the motor coil 11 includes N coil units. First ends of the N coil units in each phase winding are connected together and then respectively connected to the first phase bridge arm A, the second phase bridge arm B, and the third phase bridge arm C of the bridge arm converter 12 in a one-to-one correspondence. Second ends of the N coil units in each phase winding are respectively connected to second ends of corresponding coil units in phase windings of other two phases in a one-to-one correspondence to form N neutral points. N neutral lines lead from the N neutral points, and M neutral lines in the N neutral lines are connected to the external charging port 10, N being an integer greater than 1, and M being an integer greater than 1.

During specific implementation, in this embodiment, a value of M may be the same as a value of N, or may be different from a value of N. It should be noted that, when the value of M is different from the value of N, the value of M is smaller than the value of N.

In this embodiment, a plurality of coil units are arranged in each phase winding of the three-phase windings of the motor coil, and the plurality of coil units are selectively connected to the charging port. In this way, when the energy conversion apparatus is charged, the plurality of coil units of the plurality of phase windings of the motor coil can be fully utilized, thereby meeting the requirements of the charging power and reducing a direct-current side ripple, and resolving the problems of a large direct-current side ripple and low charging efficiency during charging in an existing battery charging method.

In addition, the plurality of coil units are arranged in the motor coil, so that when a branch of a coil unit fails, the branch may be avoided, and another branch that satisfies conditions can be used for charging, to ensure the charging power and improve fault tolerance of the energy conversion apparatus.

Figure 3:
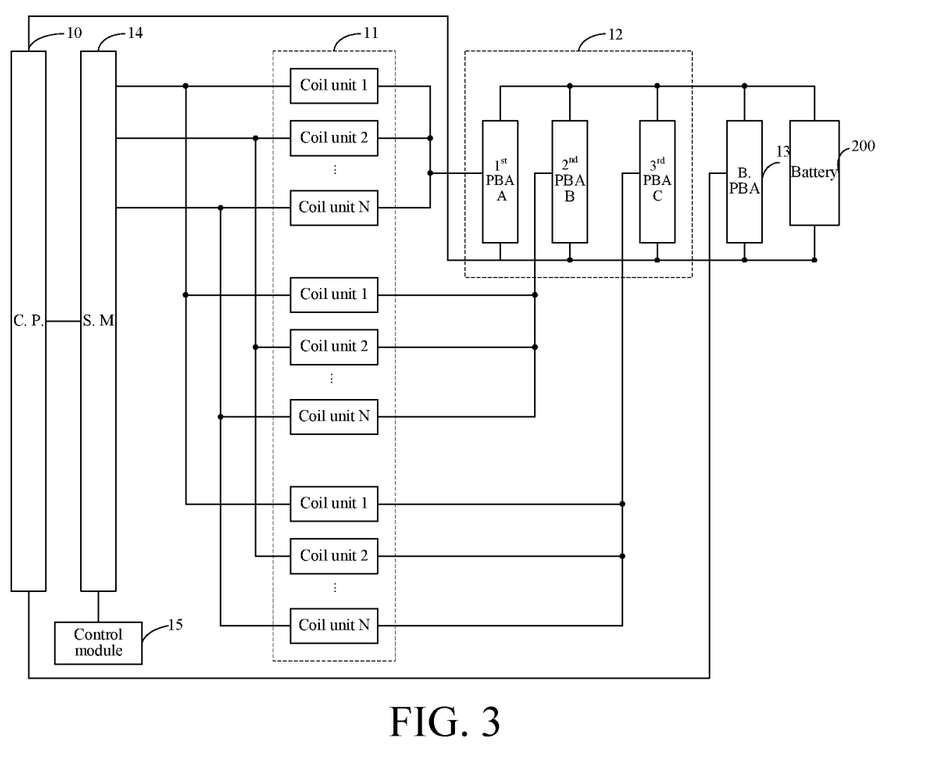
FIG. 3 is a schematic diagram of a module structure of an energy conversion apparatus according to a third embodiment of this application.

In other implementations of this application, as shown in FIG. 3, the energy conversion apparatus includes a switch module 14. The switch module 14 is connected to the N neutral lines, and the switch module 14 is selectively turned on or off, for the M neutral lines in the N neutral lines to connect to the charging port 10.

In this embodiment, the switch module is disposed in the energy conversion apparatus, so that the switch module can select part or all of the coil units from the plurality of coil units in each phase winding of the motor coil to connect to the charging port, and the charging power during charging can be adjusted through change of an inductance of the motor coil, thereby improving charging efficiency and reducing the direct-current side ripple.

To obtain the value of M, this application provides a design method. First, a target required inductance of the motor coil is calculated. Subsequently, a static test and a dynamic test are performed on a motor, and a quantity of neutral lines connected to the external charging port 10 is changed, to respectively obtain different motor coil inductances. Finally, the motor coil inductances are compared with the target required inductance, to determine an optimal quantity of neutral lines connected to the charging port 10 as the value of M.

In other implementations of this application, as shown in FIG. 3, the energy conversion apparatus further includes a control module 15. The control module 15 is connected to the switch module 14, and the control module 15 is configured to control the switch module 14 to be selectively turned on or off, for the M neutral lines in the N neutral lines to connect to the external charging port 10.

Based on the above, in an embodiment, the control module 15 controls the switch module 14 to be selectively turned on or off, for the M neutral lines in the N neutral lines to connect to the charging port 10. A target charging power or a target charging current is obtained, and the switch module 14 is controlled to be selectively turned on or off according to a value of the target charging power or a value of the target charging current, where the target charging power refers to a charging power of a battery during charging, and the target charging current refers to a charging current of the battery during charging.

Specifically, an example in which an external battery is a power battery of a vehicle is used. When the power battery needs to be charged, a battery management system (BMS) obtains power information of the power battery, then generates a corresponding charging instruction according to the power information, and feeds the charging instruction back to the control module 15. The charging instruction including the target charging power or the target charging current, that is, the target charging power or the target charging current is fed back to the control module 15, so that the control module 15 calculates the value of M according to the target charging power or the target charging current and controls the switch module 14 to be selectively turned on or off, for the M neutral lines in the N neutral lines to connect to the charging port.

In other embodiments of this application, when more coil units are connected in parallel, the inductance decreases, a coil overcurrent capability is enhanced, and the charging power or current increases. Therefore, the value of the target charging power or the value of the target charging current value is directly proportional to the quantity of neutral lines connected to the charging port. However, when the inductance decreases, the direct-current side ripple increases, which reduces the charging efficiency. Therefore, a relationship among the charging current, the charging power, and the charging efficiency needs to be considered comprehensively to determine an optimal value of M.

In this embodiment, in this application, the target charging power or the target charging current is obtained, and the value of M is calculated according to the target charging power or the target charging current, to control the switch module to selectively select, from the plurality of coil units in each phase winding of the motor coil, a quantity of coils corresponding to the target charging power or target charging current, and an inductance of the motor winding is fully utilized to obtain an actual charging power or current by changing the inductance, thereby precisely controlling the charging power.

In this embodiment, inductances of the motor coil under different values of M are stored in the control module. After the control module obtains a target motor coil inductance through calculation, the target motor coil inductance is compared with a preset motor coil inductance, to determine the optimal value quantity of neutral lines connected to the external charging port 10 as a final value of M, thereby controlling the switch module 14 to be selectively turned on or off.

In other implementations of this application, as shown in FIG. 3, the energy conversion apparatus further includes a bidirectional bridge arm 13.

The bidirectional bridge arm 13 is connected in parallel with the bridge arm converter 12, and a midpoint of the bidirectional bridge arm 13 is connected to the charging port 10.

In this embodiment, the bidirectional bridge arm 13 is disposed in the energy conversion apparatus, so that the charging port 10, the motor coil 11, the bridge arm converter 12, the bidirectional bridge arm 13, and a battery 200 form an alternating current charging circuit, thereby realizing alternating current charging of the battery 200 and improving an application range of the energy conversion apparatus.

Figure 4:
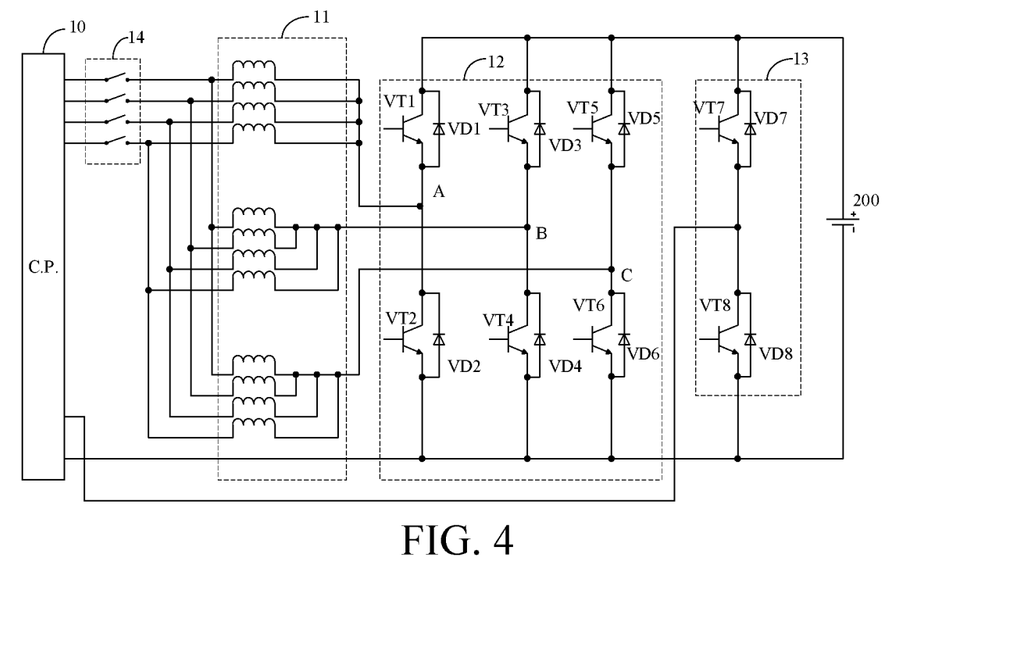
FIG. 4 is a schematic diagram of a circuit structure of an energy conversion apparatus according to a fourth embodiment of this application.

In other implementations of this application, as shown in FIG. 4, the bidirectional bridge arm 13 includes a seventh power switch unit and an eighth power switch unit. The seventh power switch unit includes an upper bridge arm VT7 and an upper bridge diode VD7. The eighth power switch unit includes a lower bridge arm VT8 and a lower bridge diode VD8. The upper bridge arm VT7 has a first end connected to first ends of bridge arms VT1, VT3, and VT5, and a second end connected to a second end of the lower bridge arm VT8 to form the midpoint of the bidirectional bridge arm 13. The second end of the lower bridge arm VT8 is connected to second ends of bridge arms VT2, VT4, and VT6.

In other embodiments of this application, as shown in FIG. 4, the switch module 14 includes N sub-switches (four sub-switches are used as an example for description in the figure, and in addition, four coil units in each phase winding in the three-phase windings of the motor coil 11 are used as an example for description in the figure). The N sub-switches are connected to N neutral lines in a one-to-one correspondence. The control module 15 is configured to control the N sub-switches to be selectively turned on or off.

Referring to FIG. 4, during specific implementation, the N sub-switches are all implemented by using single-pole single-throw switches. First ends of the N single-pole single-throw switches are all connected to the charging port, and second ends of the N single-pole single-throw switches are connected to the N coil units in a one-to-one correspondence. It should be noted that in another embodiment, the switch module 14 may alternatively be implemented by using a single-pole multi-throw switch. The single-pole multi-throw switch has a first end connected to the charging port 10, and a plurality of second ends connected to the N coil units in each phase winding in a one-to-one correspondence.

In other implementations of this application, as shown in FIG. 4, the bridge arm converter 12 includes a first power switch unit, a second power switch unit, a third power switch unit, a fourth power switch unit, a fifth power switch unit, and a sixth power switch unit. First ends of the first power switch unit, the third power switch unit, and the fifth power switch unit are connected together. Second ends of the second power switch unit, the fourth power switch unit, and the sixth power switch unit are connected together. A first phase winding of the motor coil 11 is connected to a second end of the first power switch unit and a first end of the second power switch unit. A second phase winding of the motor coil 11 is connected to a second end of the third power switch unit and a first end of the fourth power switch unit. A third phase winding of the motor coil 11 is connected to a second end of the fifth power switch unit and a first end of the sixth power switch unit.

In other embodiments of this application, in the bridge arm converter 12, the first power switch unit and the second power switch unit form a first phase bridge arm (phase bridge arm A), the third power switch unit and the fourth power switch unit form a second phase bridge arm (phase bridge arm B), and an input end of the fifth power switch unit and the sixth power switch unit form a third phase bridge arm (phase bridge arm C). The first power switch unit includes a first upper bridge arm VT1 and a first upper bridge diode VD1. The second power switch unit includes a second lower bridge arm VT2 and a second lower bridge diode VD2. The third power switch unit includes a third upper bridge arm VT3 and a third upper bridge diode VD3. The fourth power switch unit includes a fourth lower bridge arm VT4 and a fourth lower bridge diode VD4. The fifth power switch unit includes a fifth upper bridge arm VT5 and a fifth upper bridge diode VD5. The sixth power switch unit includes a sixth lower bridge arm VT6 and a sixth lower bridge diode VD6. Three phase coils of the motor are respectively connected between the upper and lower bridge arms of A, B, and C in the bridge arm converter.

In addition, as shown in FIG. 4, in this embodiment of the present disclosure, a plurality of switch units included in the bridge arm converter 12 and the bidirectional bridge arm 13 may be implemented by using devices capable of performing switching actions, for example, a power triode, a metal-oxide-semiconductor field-effect transistor (MOSFET), an insulated gate bipolar transistor (IGBT), and another switching device.

In other embodiments of this application, after the control module 15 selects a corresponding coil unit according to the target charging power or the target charging current, the control module 15 controls the three phase bridge arms of the bridge arm converter 12 to work in a synchronous control manner or in a three-phase interleaved control manner. A specific implementation process of the synchronous control manner can be referred to the related art, and are not described herein again. A specific working process of the three-phase interleaved control manner is as follows:

Specifically, the control module 15 obtains three-phase control signals including a first control signal, a second control signal, and a third control signal that differ by a preset phase in sequence; and alternately turning on two power switches of the first phase bridge arm according to the first control signal, alternately turning on two power switches of the second phase bridge arm according to the second control signal, and alternately turning on two power switches of the third phase bridge arm according to the third control signal, to charge the battery.

In this embodiment of this application, the vehicle needs to satisfy two conditions during charging, a charging instruction is received and state information of the vehicle indicates a stationary state. Before charging the battery, the state information of the vehicle need to be confirmed, and whether a charging instruction sent by an upper computer is received. When the state information of the vehicle indicates the stationary state and the charging instruction is received, the vehicle enters a charging mode.

In this embodiment of this application, the state information of the vehicle is fed back by a device on the vehicle that can represent a state of the vehicle, for example, a motor rotation speed fed back by a motor, and the state information of the vehicle includes non-stationary state information and stationary state information. The stationary state information refers to a state of the vehicle in which the vehicle is in a locked state when the vehicle is stopped, that is, a motor rotation speed of the vehicle is less than a specific preset rotation speed. Similarly, a charging instruction of the power battery is fed back by the BMS, and the BMS monitors a power state of the power battery in real time, and feeds back a charging instruction according to a monitored result.

After the state information of the vehicle and a charging requirement fed back by the BMS are received, if the state information of the vehicle indicates a non-stationary state, the vehicle enters a motor drive mode. A principle of the motor drive mode is the same as the existing motor drive principle. Details may be referred to the related art, and are not described herein again. When the state information of the vehicle indicates a stationary state and the charging requirement fed back by the BMS is charging, it indicates that the battery of the vehicle needs to be charged, and therefore, the vehicle enters the charging mode. In addition, the charging mode includes a direct current charging mode and an alternating current charging mode, and the alternating current charging mode includes, but is not limited to single-phase alternating current charging and three-phase alternating current charging.

After the vehicle enters the charging mode, the three-phase control signals can be obtained, and states of two power switches of each phase bridge arm in the bridge arm converter can be controlled according to the obtained three-phase control signals, to charge the battery. It should be noted that in this embodiment, the preset phase may be set as required, and this is not specifically limited herein.

A principle and a process of how the control module 15 obtains the three-phase control signals including the first control signal, the second control signal, and the third control signal that differ by the preset phase in sequence are described in detail as follows:

obtain a rotor angle signal, three-phase charging currents, a preset quadrature axis current, a preset direct axis current, a feedforward voltage, and a bus-side direct-current voltage of a motor in a charging mode;

obtain three-phase modulation signals according to the rotor angle signal, the three-phase charging currents, the preset quadrature axis current, the preset direct axis current, the feedforward voltage, and the bus-side direct-current voltage; and obtain a preset carrier signal, and obtain the three-phase control signals differing by the preset phase according to the carrier signal and the three-phase modulation signals.

In this embodiment of this application, after the vehicle enters the charging mode, corresponding parameter information needs to be obtained in the charging mode, to control the charging power during charging. The parameter information in the charging mode includes, but is not limited to a rotor angle signal, three-phase charging currents, a preset quadrature axis current, a preset direct axis current, a feedforward voltage, and a bus-side direct-current voltage of the motor in the charging mode.

Specifically, the rotor angle signal is an angle between a rotor magnetic field and a stator A-phase axis of the motor in the charging mode, and may be fed back after being obtained by an angle sensor, or may be calculated by using a current of a three-phase alternating current motor. This is not specifically limited herein. In addition, the three-phase charging currents refer to three-phase currents of the motor during charging, and the preset quadrature axis current and the preset direct axis current are a quadrature axis current and a direct axis current that are set in advance as needed.

In other implementations of this application, the control module 15 is specifically configured to:

obtain a first modulation signal according to the rotor angle signal, the three-phase charging currents, the preset quadrature axis current, the preset direct axis current, and the bus-side direct-current voltage;

obtain a second modulation signal according to the three-phase charging currents and the feedforward voltage; and obtain the three-phase modulation signals according to the first modulation signal and the second modulation signal.

In this embodiment of this application, to improve the charging power of the power battery during charging, after the control module 15 obtains the rotor angle signal, the three-phase charging currents, the preset quadrature axis current, the preset direct axis current, and the bus-side direct-current voltage of the motor in the charging mode, the first modulation signal may be obtained according to the foregoing parameters. The first modulation signal is a pulse-width modulation (PWM) signal obtained after controlling a differential mode current in a motor winding, and the PWM signal is a three-phase PWM signal.

In other implementations of this application, to improve the charging power of the power battery during charging, in addition to obtaining the first modulation signal, the control module 15 further needs to obtain the second modulation signal according to the three-phase charging currents and the feedforward voltage. The second modulation signal is a PWM signal obtained by extracting a zero-sequence current from the three-phase charging currents of the motor and then controlling a common mode current.

After the control module 15 obtains the first modulation signal and the second modulation signal, a corresponding operation may be performed on the first modulation signal and the second modulation signal, to obtain the three-phase modulation signals. In this embodiment, because the first modulation signal is the three-phase PWM signal, the three-phase modulation signals obtained after the operation is performed on the first modulation signal and the second modulation signal are also three-phase PWM signals.

In this embodiment, in this application, the first modulation signal is obtained according to the rotor angle signal, the three-phase charging currents, the preset quadrature axis current, the preset direct axis current, and the bus-side direct-current voltage, and the second modulation signal is obtained according to the three-phase charging currents and the feedforward voltage. After the first modulation signal and the second modulation signal are obtained, the three-phase modulation signals are obtained according to the first modulation signal and the second modulation signal, to obtain a final three-phase PWM signal for control of the bridge arm converter by using the three-phase modulation signals, so as to regulate the charging power of the power battery during charging, to improve the charging power.

In other implementations of this application, the control module 15 is further specifically configured to:
  perform coordinate transformation on the three-phase charging currents according to the rotor angle signal, to obtain two-phase charging currents;
  obtain a quadrature axis voltage and a direct axis voltage through current regulation after calculating differences between the two-phase charging currents and the preset quadrature axis current and the preset direct axis current; and
  obtain the first modulation signal according to the rotor angle signal, the quadrature axis voltage, the direct axis voltage, and the bus-side direct-current voltage.

In this embodiment of this application, a specific principle of performing coordinate transformation on the three-phase charging currents according to the rotor angle signal, to obtain two-phase charging currents is the same as that of the related art. Details may be referred to the related art, and are not described herein again.

After obtaining the two-phase charging currents, the control module 15 may calculate differences between the two-phase charging currents and the preset quadrature axis current and the preset direct axis current, and obtain a quadrature axis voltage and a direct axis voltage through current regulation. The current regulation herein may be implemented by using a proportional integral (PI) regulation method. Certainly, it may be understood by a person skilled in the art that the current regulation may alternatively be implemented by using another method such as fuzzy regulation or intelligent regulation, which is not specifically limited herein. After obtaining the quadrature axis voltage and the direct axis voltage, the control module 15 may obtain the first modulation signal according to the rotor angle signal, the quadrature axis voltage, the direct axis voltage, and the bus-side direct-current voltage.

It should be noted that, in this embodiment of this application, to prevent the motor from outputting a torque, values of the preset quadrature axis current and the preset direct axis current may be set, so that the torque outputted by the motor is zero. Specifically, in this embodiment, the preset quadrature axis current may be independently set to zero, that is, as long as the preset quadrature axis current is zero, the motor does not output any torque. In another embodiment, the preset direct axis current and the preset quadrature axis current may be simultaneously set to zero, so that the torque outputted by the motor is zero, thereby suppressing the torque output of the motor.

In addition, in this embodiment of this application, through the three-phase charging currents according to the rotor angle signal of the motor, the current three-phase alternating current charging currents in a stationary coordinate system are transformed into two-phase charging currents, namely, the direct axis current and the quadrature axis current, in a synchronous rotating coordinate system, so that differences between the obtained two-phase charging currents and the preset quadrature axis current and the preset direct axis current may be calculated based on a standard in the same coordinate system, thereby improving accuracy of the charging power regulation process.

In some other implementations of this application, the control module 15 is further specifically configured to:
  extract a zero-sequence current from the three-phase charging currents;
  obtain a modulation voltage through a current regulation after calculating a difference between the zero-sequence current and a given charging current, the given charging current being obtained by analyzing a charging instruction; and
  obtain the second modulation signal through voltage regulation after calculating a sum of the modulation voltage and the feedforward voltage.

In this embodiment of this application, the zero-sequence current is a common mode current flowing through the motor winding. To control a charging current of the motor winding, the current is zero before charging starts, and when the control module 15 receives a charging power instruction or a charging current instruction, the current is gradually increased until reaching a target current value. Therefore, after the vehicle enters the charging mode, to improve the charging power, the zero-sequence current needs to be extracted from the three-phase charging currents of the motor in the charging mode. It should be noted that, the zero-sequence current extracted in this case is not zero.

After extracting the zero-sequence current, the control module 15 calculates a difference according to the zero-sequence current and the given charging current, and then obtains a modulation voltage through current regulation, to obtain the second modulation signal according to the modulation voltage and the feedforward voltage. It should be noted that, in this embodiment, the given charging current is obtained according to the charging instruction fed back by the BMS, that is, after the charging instruction of the power battery fed back by the BMS is received, the charging instruction can be analyzed to obtain a required charging current or charging power.

In this embodiment, the zero-sequence current is extracted from the three-phase charging currents, and then the modulation voltage is obtained according to the zero-sequence current, to obtain the second modulation signal according to the modulation voltage, so that when final three-phase control signals for controlling the three phase bridge arms of the bridge arm converter are obtained according to the second modulation signal, a current value in the charging process can be effectively regulated according to the obtained three-phase control signals.

In some other implementations of this application, the control module 15 is specifically configured to:

add a duty cycle of the second modulation signal and a duty cycle of the first modulation signal, to obtain the three-phase modulation signals.

In this embodiment of this application, the first modulation signal is a three-phase PWM signal obtained after controlling the differential mode current in the motor winding, and the second modulation signal is a modulation signal obtained after controlling the common mode current in the motor winding. Therefore, the three-phase modulation signals obtained by adding the duty cycle of the second modulation signal and the duty cycle of the first modulation signal are modulation signals obtained after controlling the differential mode current and the common mode current in the motor winding. When final three-phase control signals are obtained by using the three-phase modulation signals, to control the bridge arm converter, the regulation of the charging power is completed and rotation of the motor can be further suppressed, thereby preventing unexpected shaking of the vehicle during charging.

In other embodiments of this application, in a case of obtaining the three-phase control signals differing by the preset phase according to the carrier signal and the three-phase modulation signals, a carrier out-of-phase method may be selected, or a modulated wave out-of-phase method may be selected, that is, out-of-phase adjustment may be performed on the three-phase modulation signals by using the carrier signal, or the three-phase modulation signals are out-of-phase signals. This process is specifically described in detail as follows:

When the carrier out-of-phase method is adopted, the carrier signal includes a first-phase carrier signal, a second-phase carrier signal, and a third-phase carrier signal, and a phase of the first-phase carrier signal, a phase of the second-phase carrier signal, and a phase of the third-phase carrier signal all differ from each other by a preset angle. The three-phase modulation signals include a first-phase modulation signal, a second-phase modulation signal, and a third-phase modulation signal. The control module 15 is specifically configured to:

superimpose the first-phase carrier signal and the first-phase modulation signal, superimpose the second-phase carrier signal and the second-phase modulation signal, and superimpose the third-phase carrier signal and the third-phase modulation signal, to obtain the three-phase control signals.

In this embodiment of this application, the carrier signal is preferably a triangular carrier signal. Certainly, it may be understood by a person skilled in the art that the carrier signal may alternatively be a carrier signal in another form such as a zigzag carrier signal that can generate an expected pulse width sequence. This is not specifically limited herein. In addition, a value of the preset angle is preferably 120 degrees, the value can minimize ripple currents on a direct current bus side and an N line. Certainly, it may be understood by a person skilled in the art that the value of the preset angle may alternatively be another value such as 60 degrees, which is not specifically limited in this application.

In other embodiments of this application, when the three-phase carrier signals are respectively superimposed onto the three-phase modulation signals, to superimpose differential mode current control and common mode current control, duty cycles of the three-phase control signals obtained after superimposition are sums of common duty cycles of the three-phase carrier signals and the three-phase modulation signals, that is, the obtained three-phase control signals differing by the preset phase are to add a duty cycle required for common mode current output to duty cycles required for three-phase differential mode current control. In this way, when the obtained three-phase control signals respectively control the three phase bridge arms of the bridge arm converter, three-phase interleaved control may be performed on the three phase bridge arms, thereby reducing the direct-current side ripple and effectively improving the charging power.

In other implementations of this application, when the modulated wave out-of-phase method is adopted, the carrier signal includes a first-phase carrier signal, a second-phase carrier signal, and a third-phase carrier signal, the three-phase modulation signals include a first-phase modulation signal, a second-phase modulation signal, and a third-phase modulation signal, and a phase of the first-phase modulation signal, a phase of the second-phase modulation signal, and a phase of the third-phase modulation signal all differ from each other by a preset angle. The control module 15 is specifically configured to:

superimpose the first-phase carrier signal and the first-phase modulation signal, superimpose the second-phase carrier signal and the second-phase modulation signal, and superimpose the third-phase carrier signal and the third-phase modulation signal, to obtain the three-phase control signals.

In this implementation, the specific implementation process of adopting the modulated wave out-of-phase method is the same as that of adopting the carrier out-of-phase method. Therefore, for the specific principle of adopting the modulated wave out-of-phase method, reference may be made to related descriptions of adopting the carrier out-of-phase method, and details are not described herein again.

The control module 15 shown in FIG. 3 is implemented based on software, and during specific implementation, the control module may alternatively be implemented by using a hardware circuit. A specific structure and a principle of the hardware circuit are described in detail as follows.

Figure 5:
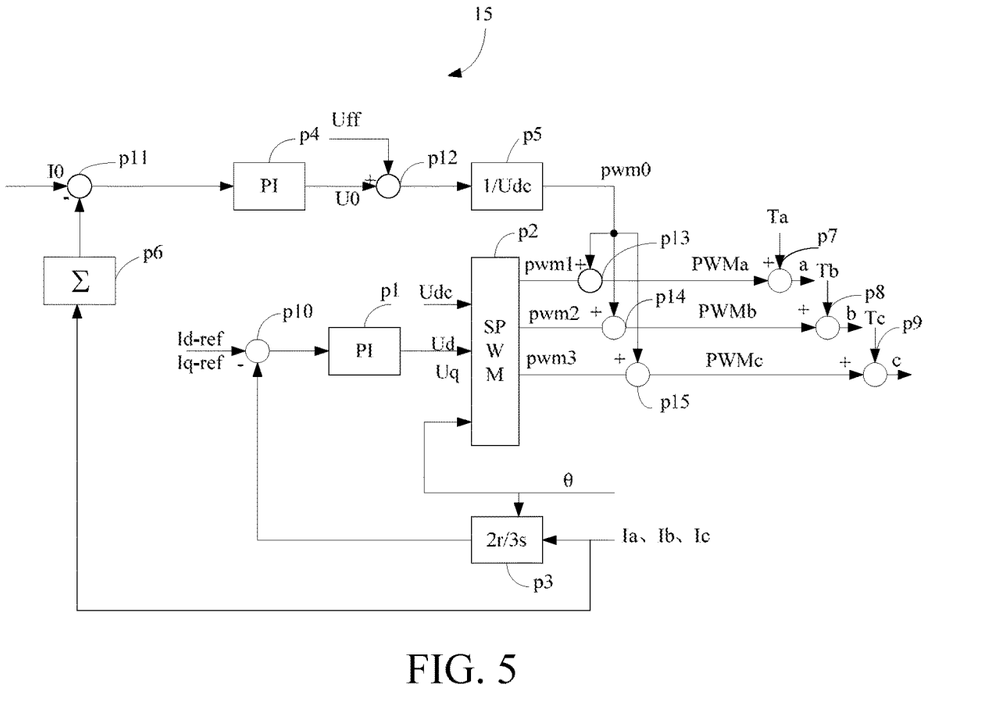
FIG. 5 is a schematic diagram of a circuit structure of a control module in an energy conversion apparatus according to a fifth embodiment of this application.

As shown in FIG. 5, the control module includes a first current regulation module P1, a first modulation module P2, a coordinate transformation module P3, a first subtraction module P10, a first summation module P6, a second current regulation module P4, a second modulation module P5, a second subtraction module P11, a second summation module P12, a third summation module P13, a fourth summation module P14, a fifth summation module P15, a first out-of-phase module P7, a second out-of-phase module P8, and a third out-of-phase module P9.

The coordinate transformation module P3 receives three-phase charging currents Ia, Ib, and Ic and a rotor angle signal $\theta$ of a motor in a charging mode, and the coordinate transformation module P3 is connected to the first subtraction module P10. The first subtraction module P10 receives a preset quadrature axis current Iq-ref and a preset direct axis current Id-ref, and the first subtraction module P10 is connected to the first current regulation module P1. The first current regulation module P1 is connected to the first modulation module P2, and the first modulation module P2 receives the rotor angle signal $\theta$, a bus-side direct-current voltage Udc, and a direct axis voltage Ud and a quadrature axis voltage Uq outputted by the first current regulation module P1.

In addition, the first summation module P6 receives the three-phase charging currents Ia, Ib, and Ic of the motor in the charging mode, and the first summation module P6 is connected to the second subtraction module P11. The second subtraction module P11 receives a given charging current I0, and the second subtraction module P11 is connected to the second current regulation module P4. The second current regulation module P4 is connected to the second summation module P12, the second summation module P12 receives a feedforward voltage Uff, and the second summation module P12 is connected to the second modulation module P5. The second modulation module P5 is connected to the third summation module P13, the fourth summation module P14, and the fifth summation module P15, and the third summation module P13, the fourth summation module P14, and the fifth summation module P15 are connected to the first modulation module P2. The third summation module P13, the fourth summation module P14, and the fifth summation module P15 are respectively connected to the first out-of-phase module P7, the second out-of-phase module P8, and the third out-of-phase module P9 in a one-to-one correspondence, and the first out-of-phase module P7, the second out-of-phase module P8, and the third out-of-phase module P9 respectively receive carrier signals Ta, Tb, and Tc.

During specific implementation, as shown in FIG. 5, the first subtraction module P10 and the second subtraction module P11 may be implemented by using a subtractor, the first summation module P6 may be implemented by using a summator, while the second summation module P12, the third summation module P13, the fourth summation module P14, and the fifth summation module P15 may each be implemented by using an adder, and the first current regulation module P1 and the second current regulation module P4 may be implemented by using a current regulator such as a PI regulator. It should be noted that, in this embodiment of this application, implementations of the first current regulation module P1 and the second current regulation module P4 may alternatively be another fuzzy regulation or intelligent regulation mode, which is not specifically limited herein.

In addition, the first modulation module P2 may be implemented by using a sinusoidal pulse width modulation (SPWM) module. The SPWM module obtains first modulation signals PWM1, PWM2, and PWM3 according to the rotor angle signal $\theta$, the bus-side direct-current voltage Udc, the direct axis voltage Ud, and the quadrature axis voltage Uq that are inputted. It should be noted that, in this embodiment, for a specific working process of the SPWM module, reference may be made to the related art, and details are not described herein. In addition, the first modulation module P2 may alternatively be implemented by using another device or module of PWM technologies, for example, an SVPWM module, a selective harmonic eliminated pulse width modulation (SHEPWM) module, or a DPWM module, which is not specifically limited herein. In addition, the second modulation module P5 may alternatively be implemented by using an existing voltage modulation module, and for details, reference is made to FIG. 5.

During specific working, after the vehicle enters the charging mode, to improve the charging power during charging and to eliminate the direct-current side ripple, the differential mode current of the motor winding needs to be controlled. In this case, the coordinate transformation module P3 transforms the obtained three-phase charging currents Ia, Ib, and Ic of the motor in the charging mode into two-phase currents, and outputs the two-phase currents obtained after transformation to the first subtraction module P10. After receiving the two-phase charging currents, the first subtraction module P10 calculates differences between the two-phase charging currents and a given preset quadrature axis current Iq-rdf and a given preset direct axis current Id-ref, and then outputs quadrature axis and direct axis voltages Uq and Ud after regulation through a PI regulation part P1. The first modulation module P2 obtains first modulation signals pwm1, pwm2, and pwm3 according to the quadrature axis and direct axis voltages Uq and Ud, the bus-side direct-current voltage Udc, and the rotor angle signal $\theta$ that are received.

When the motor is working in a power charging mode, both the differential mode current and the common mode current affect the charging power of the motor. Therefore, after the differential mode current is controlled, the common mode current of the motor winding further needs to be controlled. Specifically, after performing a summation operation on the three-phase charging currents Ia, Ib, and Ic of the motor in the charging model, the first summation module P6 extracts the zero-sequence current from the three-phase charging currents, calculates a difference between the extracted zero-sequence current and the given charging current I0, and then outputs a modulation voltage U0 to the second summation module P12 through a PI regulation part P4. The second summation module P12 calculates a sum of the modulation voltage U0 and the feedforward voltage Uff and outputs the sum to the second modulation module P5, so that the second modulation module P5 outputs a second modulation signal pwm0.

After the first modulation signals pwm1, pwm2, and pwm3 and the second modulation signal pwm0 are obtained, the third summation module P13, the fourth summation module P14, and the fifth summation module P15 respectively add duty cycles of the first modulation signals and the second modulation signal to obtain three-phase modulation signals PWMa, PWMb, and PWMc. Specifically, PWMa=pwm1+pwm0; PWMb=pwm2+pwm0; and PWMc=pwm3+pwm0.

In this application, after the three-phase modulation signals PWMa, PWMb, and PWMc are obtained, out-of-phase processing is performed on the three-phase modulation signals PWMa, PWMb, and PWMc by using the carrier out-of-phase method, that is, the first out-of-phase module P7 adds the duty cycle of PWMa in the three-phase modulation signals and a duty cycle of a carrier Ta and then outputs an a-phase modulation pulse sequence, the second out-of-phase module P8 adds the duty cycle of PWMb in the three-phase modulation signals and a duty cycle of a carrier Tb and then outputs a b-phase modulation pulse sequence, and the third out-of-phase module P9 adds the duty cycle of PWMc in the three-phase modulation signals and a duty cycle of a carrier Tc and then outputs a c-phase modulation pulse sequence. The a-phase, b-phase, and c-phase modulation pulse sequences respectively control the three phase bridge arms of the bridge arm converter, to complete a motor winding charging function.

In this embodiment, in this application, three-phase interleaved control signals are obtained by using a simple summator, subtractor, voltage modulator, current regulator, and the like, so that three-phase interleaved control may be performed on the three phase bridge arms of the bridge arm converter according to the three-phase interleaved control signals during charging of the power battery, to reduce the direct-current side ripple and effectively improve the charging power. In addition, the circuit is simple in structure, easy in implementation, and low in cost.

In other embodiments of this application, after the control module obtains three-phase control signals of a first control signal a, a second control signal b, and a third control signal c that differ by a preset phase in sequence, the control module controls power switches in the three phase bridge arms of the bridge arm converter 12 to work according to the obtained a-phase, b-phase, and c-phase interleaved pulse sequences, for three-phase inductances in the bridge arm converter 12 and the motor coil 11 to charge the power battery 200 according to a voltage outputted by an external power supply device such as a charging pile.

It should be noted that, in this embodiment, a charging control apparatus controls the three phase bridge arms of the bridge arm converter 12 to work in a three-phase interleaved mode according to the obtained a-phase, b-phase, and c-phase interleaved pulse sequences, so as to control the charging power in this case and effectively suppress the direct-current side ripple, and control the motor not to output any torque.

Figure 6:
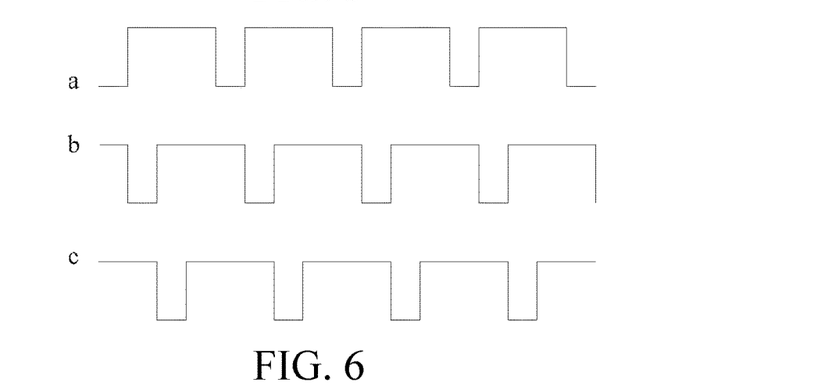
FIG. 6 is a schematic diagram of an operating time sequence of a bridge arm converter in an energy conversion apparatus according to a sixth embodiment of this application.

In other embodiments of this application, when the control module obtains the three-phase control signals of the first control signal a, the second control signal b, and the third control signal c that differ by the preset phase in sequence, the control module 15 controls the power switch units of the three phase bridge arms of the bridge arm converter 12 to work by using three-phase interleaved working time sequences shown in FIG. 6, to control the charging power. That is, when the bridge arm converter 12 is working, with reference to the working time sequence diagram shown in FIG. 6, it can be seen that the first control signal a controls the first power switch unit VT1 and the second power switch unit VT2 in the first phase bridge arm of the bridge arm converter 12 to be turned on or off, controls the first power switch unit VT1 to be turned on and the second power switch unit VT2 to be turned off when the first control signal a is at a high level, and controls the second power switch unit VT2 to be turned on and the first power switch unit VT1 to be turned off when the first control signal a is at a low level. After a preset phase difference with the first control signal a, the second control signal b controls the third power switch unit VT3 and the fourth power switch unit VT4 in the second phase bridge arm of the bridge arm converter 12 to be turned on or off, controls the third power switch unit VT3 to be turned on and the fourth power switch unit VT4 to be turned off when the second control signal b is at a high level, and controls the fourth power switch unit VT4 to be turned on and the third power switch unit VT3 to be turned off when the second control signal b is at a low level. After a preset phase difference with the second control signal b, the third control signal c controls the fifth power switch unit VT5 and the sixth power switch unit VT6 in the third phase bridge arm of the bridge arm converter 12 to be turned on or off, controls the fifth power switch unit VT5 to be turned on and the sixth power switch unit VT6 to be turned off when the third control signal c is at a high level, and controls the sixth power switch unit VT6 to be turned on and the fifth power switch unit VT5 to be turned off when the third control signal c is at a low level, to implement three-phase interleaved control of a bridge arm controller 120.

In this embodiment, in the energy conversion apparatus, the three phase bridge arms of the bridge arm converter are used in an out-of-phase manner, the inductance of the motor winding is fully utilized, the current flowing through the motor is controlled, and the preset quadrature axis and direct axis currents are set to zero, so that a corresponding charging power is completed and rotation of the motor is suppressed. In addition, by controlling the quadrature axis and direct axis currents and the zero-sequence current of the motor, a function of charging by reusing the motor winding can be effectively completed, and the inductance of the motor winding is fully utilized, completing a charging function of an electric vehicle and suppressing output of a rotation torque of the motor. Compared with the synchronous control of three phase bridge arms in the related art, in this embodiment, an inductance value of the motor winding can be fully used. Meanwhile, the direct-current side ripple can be effectively suppressed, and there is no need to add an additional inductor between the charging port and the motor coil, so that the circuit is simpler and costs are lower.

In other embodiments of this application, when the external power supply device is an alternating current power supply device, and the energy conversion apparatus is working in the charging mode, an alternating current outputted by the alternating current power supply device has a part outputted to the bridge arm converter 12 through the motor coil 11 and the charging port 10 and a part outputted to the bidirectional bridge arm 13 through the external charging port 10, and the power battery 200 is charged under the joint action of the motor coil 11, the bridge arm converter 12, and the bidirectional bridge arm 13. It should be noted that, in this embodiment, for a specific working process of the bridge arm converter 12, reference may be made to related descriptions in the energy conversion apparatus in FIG. 4, and details are not described herein again.

In other embodiments of this application, this application further provides a power system including an energy conversion apparatus.

The energy conversion apparatus further includes:
a motor, including a motor coil, where the motor coil is connected to an external charging port;
a motor control module, including a bridge arm converter, where the bridge arm converter is connected to the motor coil; and
an in-vehicle charging module, including a bidirectional bridge arm, where the bidirectional bridge arm is connected in parallel with the bridge arm converter, to form a first common connecting end and a second common connecting end, the first common connecting end is connected to an end of an external battery, the second common connecting end is connected to the other end of the battery, and the charging port is connected to the second common connecting end and the bidirectional bridge arm.

It should be noted that, in this embodiment, for a related structure and working principle of the energy conversion apparatus included in the power system, reference may be made to related descriptions of FIG. 1 to FIG. 6, and details are not described herein again.

This application further provides a vehicle including a power system. It should be noted that, the power system in the vehicle provided in this embodiment of the present disclosure is the same as the foregoing power system. Therefore, for a specific working principle of the power system in the vehicle provided in this embodiment of the present disclosure, reference may be made to detailed descriptions of the foregoing power system, and details are not described herein again.

In the present disclosure, an energy conversion apparatus including a motor coil and a bridge arm converter is used in a vehicle. The bridge arm converter is connected to an external battery and an external charging port, and the motor coil is connected to the external charging port; and a plurality of phase windings of the motor coil each include a plurality of coil units, first ends of the plurality of coil units in each phase winding are connected together and then connected to a plurality of phase bridge arms of the bridge arm converter in a one-to-one correspondence, and second ends of the plurality of coil units in each phase winding are connected to second ends of a plurality of coil units in other phase windings in a one-to-one correspondence and then selectively coupled to the external charging port. In this way, when the energy conversion apparatus is charged, the plurality of coil units of the plurality of phase windings of the motor coil can be fully utilized, thereby improving a charging power and reducing a direct-current side ripple.

A person skilled in the art may clearly understand that, for the purpose of convenient and brief description, only division of the foregoing function units is used as an example for description. In the practical application, the functions may be allocated to and completed by different function modules according to requirements. That is, an internal structure of the device is divided into different functional units or modules, to complete all or some of the functions described above. Functional units and modules in the embodiments may be integrated into one processing unit, or each of the units may exist alone physically, or two or more units are integrated into one unit. The integrated unit may be implemented in a form of hardware, or may be implemented in a form of a software functional unit. In addition, the specific names of each functional unit and module are only for the purpose of distinguishing each other, and are not used to limit the protection scope of this application. For specific work processes of the units and modules in the system, reference may be made to corresponding processes in the foregoing method embodiments, and details are not described herein again.

In the embodiments, descriptions of the embodiments have different emphases. As for parts that are not described in detail in one embodiment, reference can be made to the relevant descriptions of the other embodiments.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In the embodiments provided in this application, it is to be understood that the disclosed apparatus/terminal device and method may be implemented in other manners. For example, the described apparatus/terminal device embodiment is merely schematic. For example, the module/unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located at one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated module/unit is implemented in the form of a software functional unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommunication signal and a software distribution medium, and the like. It should be noted that, the content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In addition, the terms "first" and "second" are used merely for the purpose of description, and shall not be construed as indicating or implying relative importance or implying a quantity of indicated technical features. Therefore, features defining "first" and "second" may explicitly or implicitly include one or more such features. In descriptions of this application, "a plurality of" means two or more, unless otherwise defined clearly and specifically.

In the description of this application, unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. Moreover, the first feature "over", "above" and "up" the second feature may be that the first feature is directly above or obliquely above the second feature, or simply indicates that a horizontal height of the first feature is higher than that of the second feature. The first feature "under", "below" and "down" the second feature may be that the first feature is directly below or obliquely below the second feature, or simply indicates that a horizontal height of the first feature is less than that of the second feature.

In the descriptions of this specification, descriptions of a reference term such as "an embodiment", "some embodiments", "an example", "a specific example", or "some examples" means that a feature, structure, material, or characteristic that is described with reference to the embodiment or the example is included in at least one embodiment or example of this application. In this specification, schematic representations of the above terms are not necessarily directed to the same embodiments or examples. Moreover, the specific features, structures, materials, or characteristics described may be combined in any one or more embodiments or examples in a suitable manner. In addition, different embodiments or examples described in the present specification, as well as features of different embodiments or examples, may be integrated and combined by those skilled in the art without contradicting each other.

Although the embodiments of this application have been shown and described above, it can be understood that, the foregoing embodiments are exemplary and should not be understood as limitation to this application. A person of ordinary skill in the art can make changes, modifications, replacements, or variations to the foregoing embodiments within the scope of this application.

What is claimed is:

1. An energy conversion apparatus, comprising a motor coil and a bridge arm converter connected to the motor coil, wherein:
   the bridge arm converter is connected to an external battery and an external charging port, the motor coil is connected to the external charging port, and the bridge arm converter comprises a plurality of phase bridge arms; and
   the motor coil comprises a plurality of phase windings, each phase winding comprises N coil units, first ends of the N coil units of each phase winding are connected together and connected to a corresponding phase bridge arm of the plurality of phase bridge arms, second ends of the N coil units in each phase winding are respectively connected to second ends of corresponding coil units in other phase windings to form N neutral points, N neutral lines lead from the N neutral points, and M neutral lines in the N neutral lines are coupled to the external charging port, N being an integer greater than 1, and M being an integer greater than 1.

2. The energy conversion apparatus according to claim 1, wherein
the plurality of phase bridge arms of the bridge arm converter comprise a first phase bridge arm, a second phase bridge arm, and a third phase bridge arm;
the plurality of phase windings of the motor coil comprise three-phase windings; and
each three-phase winding of the motor coil comprises N coil units, first ends of the N coil units of each three-phase winding are connected together and connected to a corresponding phase bridge arm of the bridge arm converter, second ends of the N coil units in each three-phase winding are respectively connected to second ends of corresponding coil units in windings of other two phases to form N neutral points, N neutral lines lead from the N neutral points, and M neutral lines in the N neutral lines are connected to the external charging port, N being an integer greater than 1, and M being an integer greater than 1.

3. The energy conversion apparatus according to claim 2, further comprising a switch, wherein the switch is connected to the N neutral lines, and the switch is selectively turned on or off, for the M neutral lines in the N neutral lines to connect to the external charging port.

4. The energy conversion apparatus according to claim 3, further comprising a controller, wherein the controller is connected to the switch, and the controller is configured to control the switch to be selectively turned on or off, for the M neutral lines in the N neutral lines to connect to the external charging port.

5. The energy conversion apparatus according to claim 4, wherein the switch comprises N sub-switches, the N sub-switches are connected to the N neutral lines in a one-to-one correspondence, and the controller is configured to control the N sub-switches to be turned on or off.

6. The energy conversion apparatus according to claim 4, wherein the controller is further configured to:
   obtain three-phase control signals, the three-phase control signals comprising a first control signal, a second control signal, and a third control signal that differ by a preset phase in sequence; and
   alternately turn on two power switches of the first phase bridge arm of the bridge arm converter according to the first control signal, alternately turn on two power switches of the second phase bridge arm of the bridge arm converter according to the second control signal, and alternately turn on two power switches of the third phase bridge arm of the bridge arm converter according to the third control signal, to charge the external battery.

7. The energy conversion apparatus according to claim 6, wherein the controller is further configured to:
   obtain a rotor angle signal, three-phase charging currents, a preset quadrature axis current, a preset direct axis current, a feedforward voltage, and a bus-side direct-current voltage of a motor in a charging mode;
   obtain three-phase modulation signals according to the rotor angle signal, the three-phase charging currents, the preset quadrature axis current, the preset direct axis current, the feedforward voltage, and the bus-side direct-current voltage; and
   obtain a preset carrier signal, and obtain the three-phase control signals differing by the preset phase according to the carrier signal and the three-phase modulation signals.

8. The energy conversion apparatus according to claim 7, wherein the controller is further configured to:
   obtain a first modulation signal according to the rotor angle signal, the three-phase charging currents, the preset quadrature axis current, the preset direct axis current, and the bus-side direct-current voltage;
obtain a second modulation signal according to the three-phase charging currents and the feedforward voltage; and
obtain the three-phase modulation signals according to the first modulation signal and the second modulation signal.

9. The energy conversion apparatus according to claim 8, wherein the controller is further configured to:
perform coordinate transformation on the three-phase charging currents according to the rotor angle signal, to obtain two-phase charging currents;
obtain a quadrature axis voltage and a direct axis voltage through a current regulation after calculating differences between the two-phase charging currents and the preset quadrature axis current and the preset direct axis current; and
obtain the first modulation signal according to the rotor angle signal, the quadrature axis voltage, the direct axis voltage, and the bus-side direct-current voltage.

10. The energy conversion apparatus according to claim 8, wherein the controller is further configured to:
extract a zero-sequence current from the three-phase charging currents;
obtain a modulation voltage through a current regulation after calculating a difference between the zero-sequence current and a given charging current, the given charging current being obtained by analyzing a charging instruction; and
obtain the second modulation signal through a voltage regulation after calculating a sum of the modulation voltage and the feedforward voltage.

11. The energy conversion apparatus according to claim 8, wherein the controller is further configured to:
add a duty cycle of the second modulation signal and a duty cycle of the first modulation signal, to obtain the three-phase modulation signals.

12. The energy conversion apparatus according to claim 11, wherein
the carrier signal comprises a first-phase carrier signal, a second-phase carrier signal, and a third-phase carrier signal; the three-phase modulation signals comprise a first-phase modulation signal, a second-phase modulation signal, and a third-phase modulation signal; and a phase of the first-phase carrier signal, a phase of the second-phase carrier signal, and a phase of the third-phase carrier signal differ by a first preset angle in sequence, or the phase of the first-phase modulation signal, the phase of the second-phase modulation signal, and the phase of the third-phase modulation signal differ by a second preset angle in sequence; and
the controller is configured to:
superimpose the first-phase carrier signal and the first-phase modulation signal, superimpose the second-phase carrier signal and the second-phase modulation signal, and superimpose the third-phase carrier signal and the third-phase modulation signal, to obtain the three-phase control signals.

13. The energy conversion apparatus according to claim 7, wherein the controller is further configured to:
set the preset quadrature axis current and the preset direct axis current, for an output torque to be zero.

14. The energy conversion apparatus according to claim 1, further comprising a bidirectional bridge arm, wherein the bidirectional bridge arm is connected in parallel with the bridge arm converter, and a midpoint of the bidirectional bridge arm is connected to the external charging port.

15. A power system, comprising an energy conversion apparatus, a motor, and a motor control;
wherein the energy conversion apparatus comprises:
a motor coil and a bridge arm converter connected to the motor coil, the motor comprising the motor coil, and the motor control comprising the bridge arm converter;
the bridge arm converter is connected to an external battery and an external charging port, the motor coil is connected to the external charging port, and the bridge arm converter comprises a plurality of phase bridge arms; and
the motor coil comprises a plurality of phase windings, each phase winding comprises N coil units, first ends of the N coil units of each phase winding are connected together and connected to a corresponding phase bridge arm of the plurality of phase bridge arms, second ends of the N coil units in each phase winding are respectively connected to second ends of corresponding coil units in other phase windings to form N neutral points, N neutral lines lead from the N neutral points, and M neutral lines in the N neutral lines are coupled to the external charging port, N being an integer greater than 1, and M being an integer greater than 1.

16. The power system according to claim 15, wherein
the plurality of phase bridge arms of the bridge arm converter comprise a first phase bridge arm, a second phase bridge arm, and a third phase bridge arm;
the plurality of phase windings of the motor coil comprise three-phase windings; and
each three-phase winding of the motor coil comprises N coil units, first ends of the N coil units of each three-phase winding are connected together and connected to a corresponding phase bridge arm of the bridge arm converter, second ends of the N coil units in each three-phase winding are respectively connected to second ends of corresponding coil units in windings of other two phases to form N neutral points, N neutral lines lead from the N neutral points, and M neutral lines in the N neutral lines are connected to the external charging port, N being an integer greater than 1, and M being an integer greater than 1.

17. The power system according to claim 16, wherein
the energy conversion apparatus further comprising a switch, wherein the switch is connected to the N neutral lines, and the switch is selectively turned on or off, for the M neutral lines in the N neutral lines to connect to the external charging port.

18. A vehicle, comprising a power system, wherein the power system comprises an energy conversion apparatus, a motor, and a motor control;
wherein the energy conversion apparatus comprises:
a motor coil and a bridge arm converter connected to the motor coil, the motor comprising the motor coil, and the motor control comprising the bridge arm converter;
the bridge arm converter is connected to an external battery and an external charging port, the motor coil is connected to the external charging port, and the bridge arm converter comprises a plurality of phase bridge arms; and
the motor coil comprises a plurality of phase windings, each phase winding comprises N coil units, first ends of the N coil units of each phase winding are connected together and connected to a corresponding phase bridge arm of the plurality of phase bridge arms, second ends of the N coil units in each phase winding are respectively connected to second ends of corresponding coil units in other phase windings to form N neutral points, N neutral lines lead from the N neutral points, and M neutral lines in the N neutral lines are coupled to the external charging port, N being an integer greater than 1, and M being an integer greater than 1.

19. The vehicle according to claim 18, wherein the plurality of phase bridge arms of the bridge arm converter comprise a first phase bridge arm, a second phase bridge arm, and a third phase bridge arm;

the plurality of phase windings of the motor coil comprise three-phase windings; and each three-phase winding of the motor coil comprises N coil units, first ends of the N coil units of each three-phase winding are connected together and connected to a corresponding phase bridge arm of the bridge arm converter, second ends of the N coil units in each three-phase winding are respectively connected to second ends of corresponding coil units in windings of other two phases to form N neutral points, N neutral lines lead from the N neutral points, and M neutral lines in the N neutral lines are connected to the external charging port, N being an integer greater than 1, and M being an integer greater than 1.

20. The vehicle according to claim 19, wherein the energy conversion apparatus further comprising a switch, wherein the switch is connected to the N neutral lines, and the switch is selectively turned on or off, for the M neutral lines in the N neutral lines to connect to the external charging port.

\* \* \* \* \*